United States Patent [19]

Raschbichler et al.

[11] 4,360,748
[45] Nov. 23, 1982

[54] POLYPHASE STATOR SYSTEM FOR A LINEAR MOTOR

[75] Inventors: Hans-Georg Raschbichler, Ottobrunn; Otto Breitenbach, Nuremberg, both of Fed. Rep. of Germany

[73] Assignees: Kabel-und Metallwerke Gutehoffnungshütte AG, Hanover; Thyssen Industrie Aktiengesellschaft, Essen, both of Fed. Rep. of Germany

[21] Appl. No.: 235,550

[22] Filed: Feb. 18, 1981

[30] Foreign Application Priority Data

Feb. 21, 1980 [DE] Fed. Rep. of Germany ....... 3006382

[51] Int. Cl.³ ............................................. H02K 41/02
[52] U.S. Cl. ...................................................... 310/13
[58] Field of Search ................................... 310/12, 13

[56] References Cited

U.S. PATENT DOCUMENTS 1,754,685  4/1930  Kauter ................................. 310/13
4,314,168  2/1982  Breitenbach ........................ 310/13

FOREIGN PATENT DOCUMENTS 2721905 11/1978 Fed. Rep. of Germany.

Primary Examiner—Donovan F. Duggan
Attorney, Agent, or Firm—Ralf H. Siegemund

[57] ABSTRACT

The stator of a linear motor is comprised of a core having many parallel grooves; three cables are preassembled so that rungs of a ladder-like configuration can be laid into the grooves. The cables have, individually, a meandering configuration, and overlapping loops are tied together. The cables each have a semiconductive layer for shielding, i.e., insulation sheathings that include conductive additives. Bare wires are strung along the assembly and clamped onto the cables to electrically interconnect the shields as well as different points of the same shield for grounding.

7 Claims, 3 Drawing Figures

POLYPHASE STATOR SYSTEM FOR A LINEAR MOTOR

BACKGROUND OF THE INVENTION

The present invention relates to a polyphase, preferably a three-phase, a.c. stator system for a linear motor.

Linear motors are well known generally and for a considerable length of time; also, linear motors have been constructed in a variety of configurations; there exist d.c. motors, and synchronous as well as asynchronous a.c. motors. Generally speaking, a linear motor includes a stator being arranged in, or along, a line but not in an annular configuration. The moving armature is correspondingly constructed, it does not rotate.

The linear motor provides, generally, a conversion of electrical energy into translatory, mechanical energy. A three-phase motor, for example, has three separate energizing systems, being suitably arranged in the stator body and inductor. The armature may consist of a rail element made of copper or aluminum, i.e., of a good electrical conductor in order to establish an asynchronous motor. Alternatively, the armature may be comprised of a permanent magnetic body for establishing a synchronous motor. A certain variety of linear motors include coils on the armature.

Linear motors are used for a variety of purposes, such as "people movers," as a drive in the conveyor and transport art, as, for example, for handling baggage or, generally, for moving freight. Linear motors are also used in mining, for operating cranes, drag equipment, slides in machine tools, for the operation of gates, and so forth. The length of such a motor depends greatly upon its use and the length of the path to be traversed.

A linear motor of the type to which the invention pertains is usually comprised of an elongated inductor body having grooves for receiving windings, and it cooperates with the armature which is caused to move along the inductor stator. The stator windings are, for example, comprised of cables suitably placed into the grooves. For instance, it is known to construct a coherent, ladder-like assembly from three cables which are interconnected in such a manner that they constitute a prefabricated entity, can be transported as a whole, and just be laid into the stator grooves. The spacing of the "rungs" of the "ladder" corresponds to the groove-spacing of the stator and inductor body which has previously been installed along the path that the armature is to take (see, e.g., U.S. Pat. No. 4,246,694, Ser. No. 909,794, filed on May 26, 1978).

If such a linear motor is to be used, for example, as a motive power unit for a magneto-aerial railway, the stator is inherently very long. Since the motor will be operated at a rather high voltage, the cable must be provided with at least one shield. The shield for such a cable is needed for a variety of reasons. Capacitive charges have to be conducted at not too high a resistance; short circuits of the cables to ground and other faults have to be recognized and located via such a shield, and the cable insulation proper must be protected against damage. Furthermore, the shield should protect people and animals against shocks from the rather high voltage, even though the voltages are usually "only" in the median range, such as 1.500 V. It is apparent that the shield fulfills its function the better, the closer its potential is to ground potential. Ideally, the entire shield is grounded.

Such a cable, having an external shield and being used for establishing stator windings of a linear motor, may experience longitudinal voltages in the order of 1 kilovolt per 100-meter stator length. Such a high voltage can be suppressed, e.g., by subdividing the shield into much smaller sections and grounding each section separately. This obviously is a very expensive approach and, besides, cable defects would readily be invited.

Another approach would be to simply ground the shield at both ends of a lengthy section which would, however, merely reduce the effective voltage in and along the shield. Also, one can interconnect, electrically, the shield of the various (cable) phases in various points along the stator. However, this approach entails high shield currents with correspondingly high losses of electrical energy. The shield's system may actually function as a kind of eddy current brake.

Test construction involve one-sided grounding of the shield in points spaced at large distances from each other. But that approach requires careful insulation of the shield itself because by and in itself, it does not function as a protection for people or animals.

DESCRIPTION OF THE INVENTION

It is an object of the present invention to provide a new and improved stator-winding system for a linear motor in which high voltages and high currents in the shield of the cable used for the system are avoided without danger to humans and animals who may come in contact with the winding system during operation.

It is a specific object of the present invention to provide a new and improved winding system which is prefabricated by assembling and overlaying plural cables in a meandering pattern in order to obtain a ladder-like, coherent configuration which can be placed, as a whole, onto and into the stator core and inductor of a linear motor; see, for example, U.S. Pat. No. 4,246,694, Ser. No. 909,794, filed on May 26, 1978.

In accordance with the preferred embodiment of the present invention, it is suggested to provide such a stator winding as set forth in the specific object, but to use cables which have an outer semi-conductive layer, such as an insulating material to which a conductive material has been added, and to string one or more wires along the meandering pattern, but off those transverse portions of the cable which will be placed into parallel stator grooves, in order to be in intimate, contact-making engagement with the numerous overlapping cable portions of the overlaid, meandering pattern. This wire is to be connected to ground in as many places as may be deemed desirable. Preferably, bare cooper or aluminum wires will be used. Clamps which tie the cables together can be used to also hold this wire against the shielding layers of the cable.

The resulting configuration establishes adequate shielding and bleeds off capacitively induced charges from the shields at low current intensities because the voltages that can occur are quite low to begin with, thus well protecting humans and animals. The losses of this stator-winding assembly are quite low, due to grounded shielding, and the field strength is not significantly disturbed.

The cables, to be used in the stator-winding assembly, are, basically of the medium-voltage cable type. However, they differ from some of these cables through the absence of a copper shield. Thus, the cables are simpler in construction due to the employment of an insulating sheathing that has been rendered conductive.

DESCRIPTION OF THE DRAWINGS

While the specification concludes with claims, particularly pointing out and distinctly claiming the subject matter which is regarded as the invention, it is believed that the invention, the objects and features of the invention, and further objects, features and advantages thereof, will be better understood from the following description taken in connection with the accompanying drawings, in which:

Proceeding now to the detailed description of the drawings, FIG. 1 illustrates three cables 1, 2, and 3 which have been joined and combined into a coherent structure and assembly, each as suggested, for example, in the above-identified patent, or in Ser. No. 45,952, filed on Jun. 6, 1979; Ser. No. 151,658, filed on May 20, 1980. The cables are distinguished in FIG. 1 by different surface shadings for facilitating tracing them in the drawing. In reality they may look alike. The inductor or core part 4 of the stator consists of a laminated construction; i.e., it is comprised of metal sheets. The windings, as established by the cable, extend laterally from the stator inductor, and overlapping loop portions are tied together, e.g., by means of clamps 7.

Two wires 5 and 6 run generally parallel to the stator inductor, to respectively both sides thereof. These wires are made of copper or other electrically conductive material of good conductivity. The clamps 7 clamp the wires against the projecting, back-looping portions of the three cables. They thus perform the additional function of urging the wires 5 and 6 into electrically conductive contact with the cable surfaces. The applications above suggest various ways of tieing the cables together. These constructions can be used in lieu of, or in addition to, clamps. However, care must be taken that some clamping action is provided along the assembly to ensure contact-making engagement between the surfaces of the cables and the wires.

Figure 1:
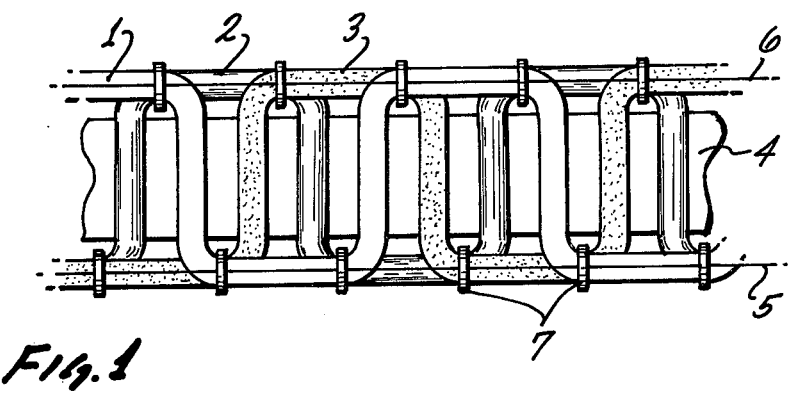
FIG. 1 illustrates a top elevation of a portion of a stator of a linear motor improved in accordance with the preferred embodiment of the present invention.
Figure 2:
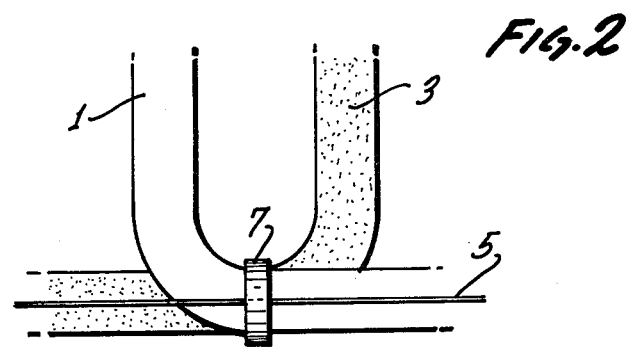
FIG. 2 illustrates a detail of the structure shown in FIG. 1.

As shown specifically in FIG. 1, the wires 5 and 6 are just placed on top of the cable, from the one side thereof, this being the elevational side as viewed in FIG. 6. Instead, one can more or less weave the wires through the cable so that each wire is, for example, clamped in between respective two overlapping cable loops in the range of the respective clamp 7.

For the specific purpose of the invention, namely grounding the cables consistently and at short distances; one wire, wire 5 or 6, suffices. However, it can readily be seen that each one of the wires performs the additional function of typing the cables together. For reasons of structural symmetry and better coherency in the assembly, it is prefered to use two wires as shown.

The wires 5 and/or 6 will be connected to ground in as many places as is desired. One should make such a connection preferably at least with each feeding and voltage supply point of the cables.

Figure 3:
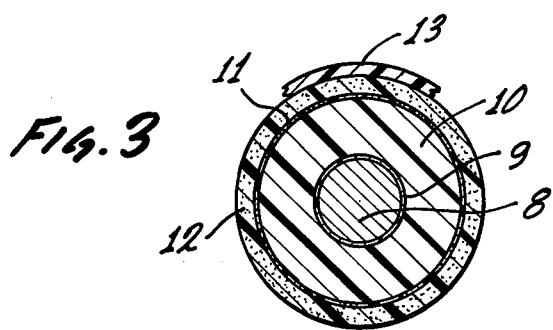
FIG. 3 illustrates a cross section through a cable used in the construction shown in FIG. 1.

FIG. 3 illustrates a cable of the type that is preferably used for a stator in accordance with the invention. This cable is comprised of a conductor 8, being, for example, a plurality of stranded-together wires, the bundle being covered with a surface-smoothing layer 9. This conductor is covered by an insulation jacket or envelop 10 which, in turn, carries an outer, conductive layer 11. This outer layer may have a resistivity of 400 ohms per meter. The layer 11 is covered by an outer jacket 12 made of an insulative material which has been rendered conductive by suitable additives. Its resistivity should be approximately 100 ohms per meter.

The conductor core 8 is preferably made from copper or aluminum, e.g., one uses wires or filaments of these metals or sector conductors. A solid conductor can also be used in principle. It is required, however, that the cable can be bent easily into the meandering configurations shown in FIG. 1, which feature requires a high degree of flexibility.

The insulation 10 is preferably made of an ethylene-propylene rubber. The jacket 12 is made, for example, of polyurethane or polyvinyl chloride, rendered conductive by the addition of carbon black, graphite, or a metal powder, at a ratio that establishes the above-mentioned resistivity.

The grooves in the inductor and core 4 may have rather sharp edges. Thus, the outer layer 12 of the cables may require further protection, such as a mechanically strong insulation. That insulation, however, must not cover the conductive layer completely because electrical contact with the wires 5 and 6 must be assured. The additional protection may, thus, be provided as ribbons (13) wound helically around the cable and exposing sufficient amounts of the layer 12 for contact-making purposes, as described.

Alternatively, the layer 12 is made sufficiently strong and thick so that it can take some damages without impairment to its function and purpose.

It can, thus, be seen that the stator of the linear motor is made of cables having a shield of relatively low conductivity; but these shields are interconnected by highly conductive wires which do not only interconnect the different shields of different cables, but also different points of the same cable which are not spaced too far apart. The currents that flow through these wires (5 and 6) bleed off capacitively induced charges at a low current so that any point on any of the cables will never have any dangerously high potential to ground.

The invention is not limited to the embodiments described above; but all changes and modifications thereof, not constituting departures from the spirit and scope of the invention, are intended to be included.

I claim;

1. A polyphase a.c. winding for a linear motor, comprising in combination
    a plurality of cables, each one arranged in a meandering pattern, the cables being arranged to overlap and to establish a plurality of parallely extending cable portions, wherein spaced-apart but adjacent portions pertain to different ones of the cables, the parallel portions being provided for placement into respectively parallel extending stator core grooves;
    the cables each having at least one semiconductive shielding layer, at least a portion of the layer of each cable being exposed;
    at least one bare wire being strung along the pattern, off said parallel portions, and being in contact-making engagement with said shielding layers of said cables, said wire provided for connection to ground; and
    means for tying the cables together.

2. A stator for a linear motor, comprising in combination core means having a plurality of spaced-apart grooves extending parallel to each other and transverse to the extension of the core means;

a plurality of cables laid into the grooves in a meandering pattern so that adjacent to each two ones of the grooves two different cables overlap;

means for tying the overlapping cables together;

the cables having an outer, electrically semiconductive shield being at least partially exposed; and at least one wire strung along the core and being clamped to the cables, whereby each wire makes contact with all cables, and at different points of each cable.

3. The combinations as in claim 1 or 2, wherein each cable is covered with a protective ribbon, leaving, however, portions of the semiconductive layer exposed in order to obtain said contact-making engagement.

4. The combination as in claim 1 or 2, the means for tying including clamps for clamping the wires to the cables.

5. The combination as in claim 1 or 2, there being three such cables for obtaining a three-phased system.

6. The combination as in claim 1 or 2, said semiconductive layer being an insulating layer to which conductive material has been added.

7. The combination as in claim 6, the insulating layer being made of polyvinyl chloride or polyurethane, the conductive material being carbon black, graphite, or metal powder.

* * * * *